United States Patent
Swanson

[11] Patent Number: 5,996,434
[45] Date of Patent: Dec. 7, 1999

[54] PRESSURE HEAD WITH DUAL HORNS

[76] Inventor: David W. Swanson, 2750 Felicita Rd., Escondido, Calif. 92029

[21] Appl. No.: 08/901,916

[22] Filed: Jul. 29, 1997

[51] Int. Cl.$^6$ .................................................. B23K 20/20
[52] U.S. Cl. .............................. 74/110; 267/160; 228/5.5; 100/269.2
[58] Field of Search ................................ 74/110; 228/5.5, 228/44.7, 107; 100/320, 326, 269.2; 267/158, 160; 360/103

[56] References Cited

U.S. PATENT DOCUMENTS

| | | | |
|---|---|---|---|
| 618,910 | 2/1899 | Seng | 267/160 |
| 3,310,792 | 3/1967 | Groom et al. | 360/103 |
| 3,581,298 | 5/1971 | Billawala | 360/103 |
| 3,599,193 | 8/1971 | Cote et al. | 360/103 |
| 3,701,610 | 10/1972 | Buslik et al. | 360/103 |
| 3,931,641 | 1/1976 | Watrous | 360/103 |
| 4,013,208 | 3/1977 | Mason et al. | 228/44.7 |
| 4,203,554 | 5/1980 | Zimmer et al. | 267/160 |
| 4,399,476 | 8/1983 | King | 360/103 |
| 4,662,579 | 5/1987 | Gelardi et al. | 267/158 |
| 4,768,702 | 9/1988 | Takahashi et al. | 228/5.5 |
| 4,875,614 | 10/1989 | Cipolla et al. | 228/5.5 |
| 4,934,671 | 6/1990 | Laninga et al. | 269/20 |
| 5,092,510 | 3/1992 | Anstrom et al. | 228/5.5 |
| 5,127,573 | 7/1992 | Chang et al. | 228/5.5 |
| 5,150,827 | 9/1992 | Fries | 228/44.7 |
| 5,307,981 | 5/1994 | Heckman et al. | 228/5.5 |
| 5,368,217 | 11/1994 | Simmons et al. | 228/44.7 |
| 5,377,897 | 1/1995 | Zimmer | 228/44.7 |
| 5,529,277 | 6/1996 | Ostaszewski | 267/158 |
| 5,689,026 | 11/1997 | Kawatani et al. | 228/5.5 |

FOREIGN PATENT DOCUMENTS

| | | | |
|---|---|---|---|
| 901830 | 6/1972 | Canada | 267/160 |

Primary Examiner—Thomas R. Hannon
Assistant Examiner—William C Joyce
Attorney, Agent, or Firm—Calif Tervo

[57] ABSTRACT

A pressure head (10) for contacting pressure areas through relative movement in the vertical Z-direction includes a frame (20), a pair of horn assemblies (12) each including a horn (100) for contacting a workpiece (230), the horn (100) supported by a gimbal (40) connected to the frame (20) and a pair of pressure assemblies 15, each including a pressure cylinder (310) for applying a force to its horn (100). The gimbal (40) has only a single outer torsion member (50) and supports the horn (100) such that the horn (100) can rotate about orthogonal X and Y rotation axes and can translate in the Z-direction relative to frame (20). Each gimbal (40) having only a single outer torsion member (50) allows a pair of gimbals (40) to support horns (100) in close proximity for operation on two proximal work areas.

9 Claims, 5 Drawing Sheets

PRESSURE HEAD WITH DUAL HORNS

CROSS REFERENCE TO RELATED APPLICATION

This application is related to my co-pending application Ser. No. 08/806088 filed Feb. 25, 1997 titled PRESSURE HEAD WITH PIVOT ROD GIMBAL WITH ZERO ADJUST and to my co-pending application Ser. No. 08/878,020 filed Jun. 18, 1997 titled GIMBAL HORN PRESSURE HEAD WITH SHAPE OF PIVOT ROD BEARING CORRESPONDING TO SHAPE OF CONTACT SURFACE, which are herein incorporated by reference as if fully set forth at length herein.

BACKGROUND OF THE INVENTION

1. Field of the Invention

This invention relates in general to a pressure head for bonding parts with heat and pressure and more specifically to a pressure head having a pair of closely-spaced, gimbaled horns and further in that pressure assemblies independently control the downward force on each horn.

2. Description of the Related Art

A pressure head is commonly used to attach one item to another. The head must move relative to the workpiece. In some applications the workpiece is moved into contact with the head. In other applications, the head is moved by a thruster, such as a pneumatic cylinder. The horn, that is the working element of the head, may be heated for bonding work pieces together, that is one article to another with heat and pressure. For example, a ribbon cable circuit may be bonded to an electronic component or a flip chip may be bonded to the electronic package circuitry.

In many applications it is necessary to conduct two bonds in close proximity, such as bonding a short flexible circuit to two electrical components. Often the amount of heat and pressure to be applied in such a bonding differs between the two bonds.

Therefore, there has been a need for a pressure head having several horns in close proximity. It is further desirable that the pressure applied by each horn of a multiple horn pressure head be independently selectable.

SUMMARY OF THE INVENTION

This invention is a pressure head having two horn assemblies for contacting two pressure areas through relative movement in the vertical Z-direction. Preferably the head also includes two pressure assemblies. The head generally comprises a frame, a first horn for contacting a first pressure area, a first gimbal connected to the frame and gimbally supporting the first horn such that the first horn may rotate about an X-axis and a Y-axis and may translate in the Z-direction relative to the frame, the first gimbal having only a single outer torsion member, a second horn for contacting a second pressure area, a second gimbal connected to the frame and gimbally supporting the second horn such that the second horn may rotate about an X-axis and a Y-axis and may translate in the Z-direction relative to the frame, the second gimbal having only a single outer torsion member. Having only a single outer torsion member allows a pair of gimbals to support horns in close proximity for operation on two proximal work areas.

A pivot rod associated with each horn includes a tip for bearing against the top of its horn such that its horn may rotate about the X-axis and Y-axis and for applying downward pressure to its horn. A pressure assembly associated with each horn controls the downward force on its pivot rod.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
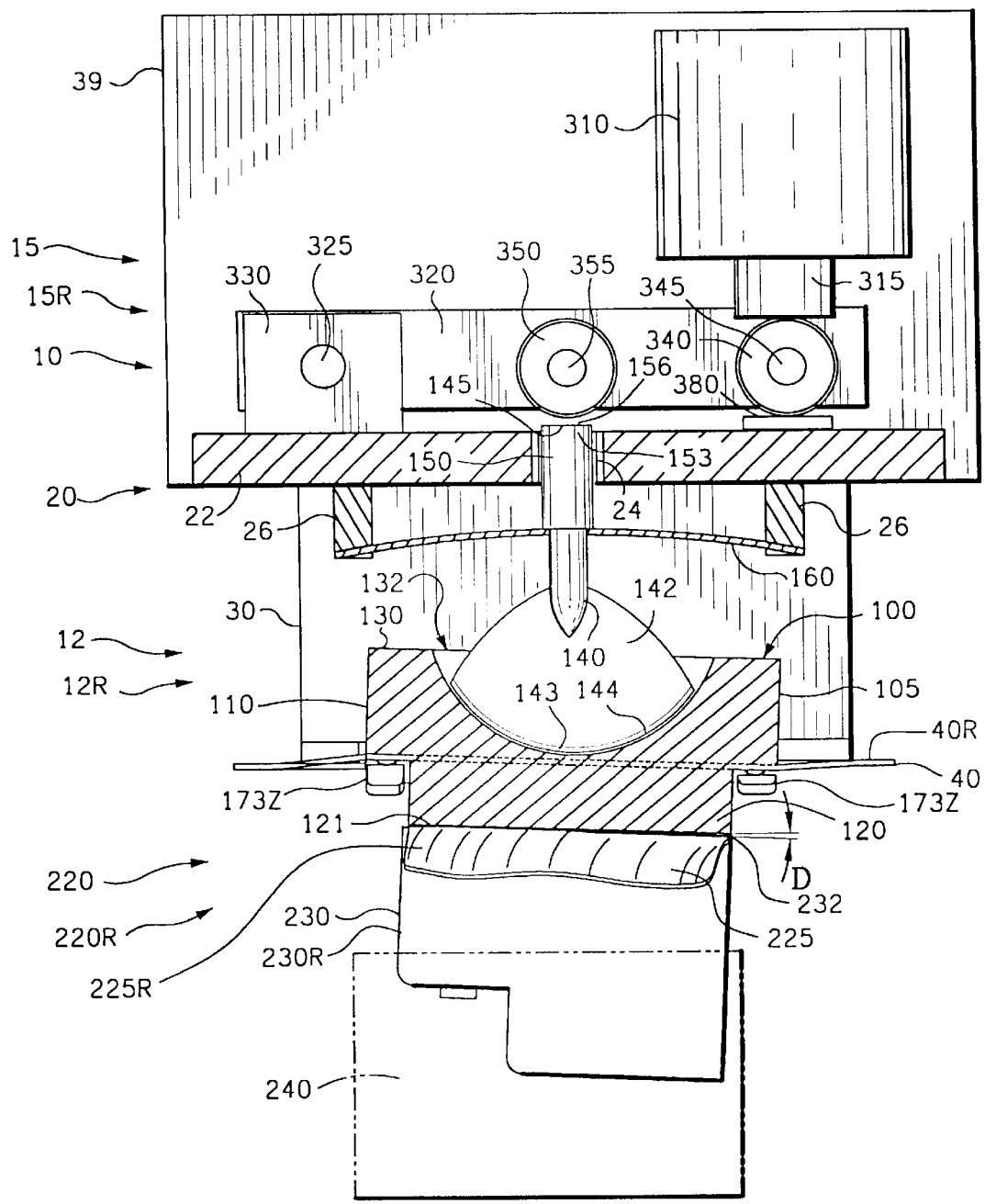
FIG. 1 is a cross sectional left side view of the right half of a preferred embodiment of the pressure head of the invention showing an attached thruster and shown bonding a ribbon circuit onto an electronic article.

With reference now the drawings, there is shown in FIG. 1 a left side view of the right half of a preferred embodiment of the pressure head 10 of the invention. Pressure head 10 includes a frame 20 including a base plate 22, gimbal support walls 30 and upper walls 39; horn assemblies 12 and pressure assemblies 15. Horn assemblies 12, such as right horn assembly 12R are disposed generally below base plate 22 and pressure assemblies 15, such as right pressure assembly 15R, are disposed generally above base plate 22. In the preferred embodiment, the unseen left horn assembly 12L is a mirror image of right horn assembly 12R and the unseen left pressure assembly 15L is a 180° horizontally rotated right pressure assembly 15R.

A thruster, such as linear thruster (not shown), is attached to pressure head 10, such as to frame 20, such as to the upper end of upper walls 39, for moving pressure head 10 toward and away from workpieces 220, such as right work pieces 220R, such as right flexible circuit 225R and right electronic component 230R held in holding fixture 240 so as to bond right flexible circuit 225R onto right electronic component 230R, as is shown.

For ease of description with reference to the drawings, the direction (generally vertical) of movement of head 10 relative to workpieces 220 is considered the Z direction; the left/right direction is the X direction and the front/back direction is the Y direction.

A thruster moves head 10 up and down in the Z direction to engage and disengage from workpieces 220. Although a thruster may be used to move head 10, many other devices may be used instead to cycle the head/workpiece contact, including devices moving workpieces 220.

By way of example as seen in FIG. 1, a flexible circuit 225 is being bonded to the upper surface 232 of electronic part 230. Electronic part 230 is supported by holding fixture 240. The workpiece face, in this case the upper surface 232 of electronic part 230, is slanted or angled in the X-axis an angle D from horizontal. Upper surface 232 may also be slanted in the Y-axis direction. The angling of workpiece face 232 may be the result of many factors or the combination thereof, such as imperfect placement in holding fixture 240 or tolerances in fabrication of the part 230. The contact area of the workpiece is the workpiece area that contacts pressure head 10. The contact area is generally determined by the size and shape of the workpieces being joined. In the illustration, a ribbon or flexible circuit 225 is being joined to electrical component 230. This typically requires a long, narrow contact area. In the illustration, the contact area of horn 100 is the entire area of bottom 121 of horn tip 120.

As an overview, head 10 is shown in the bonding position. The bottom 121 of horn 100 of head 10 has contacted workpieces 220 causing horn 100, gimbaled on gimbal 40, to rotate about push rod bearing surface 144 an angle D relative to the X-axis such that horn bottom 121 is aligned with workpiece face 232. Pivot rod 140 is applying pressure from pressure assembly 15 to horn 100 and thus to workpieces 220. This operation is explained in greater detail below.

Figure 2:
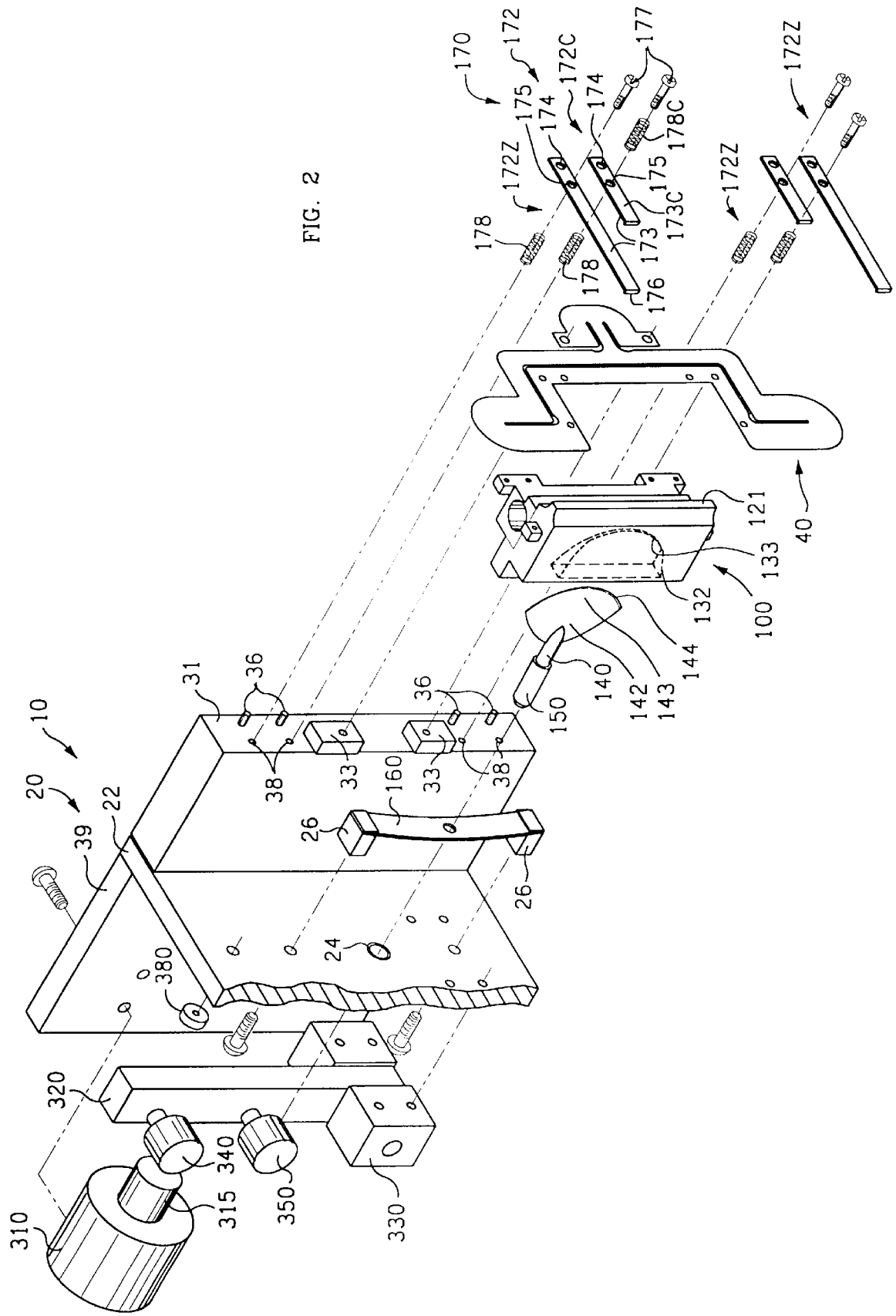
FIG. 2 is an exploded perspective view of the pressure head of FIG. 1
Figure 3:
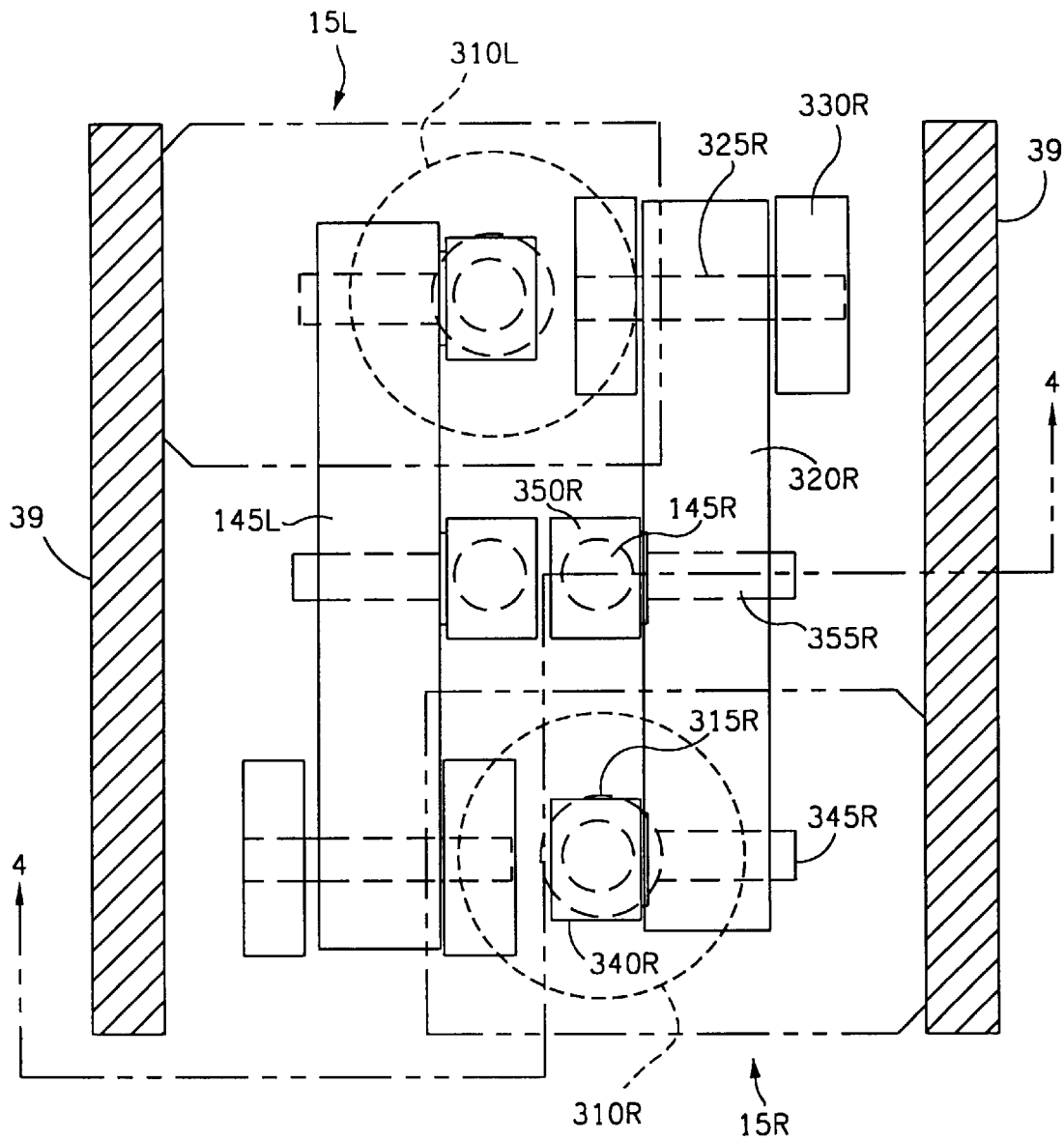
FIG. 3 is a top plan view of the preferred embodiment of the invention.
Figure 4:
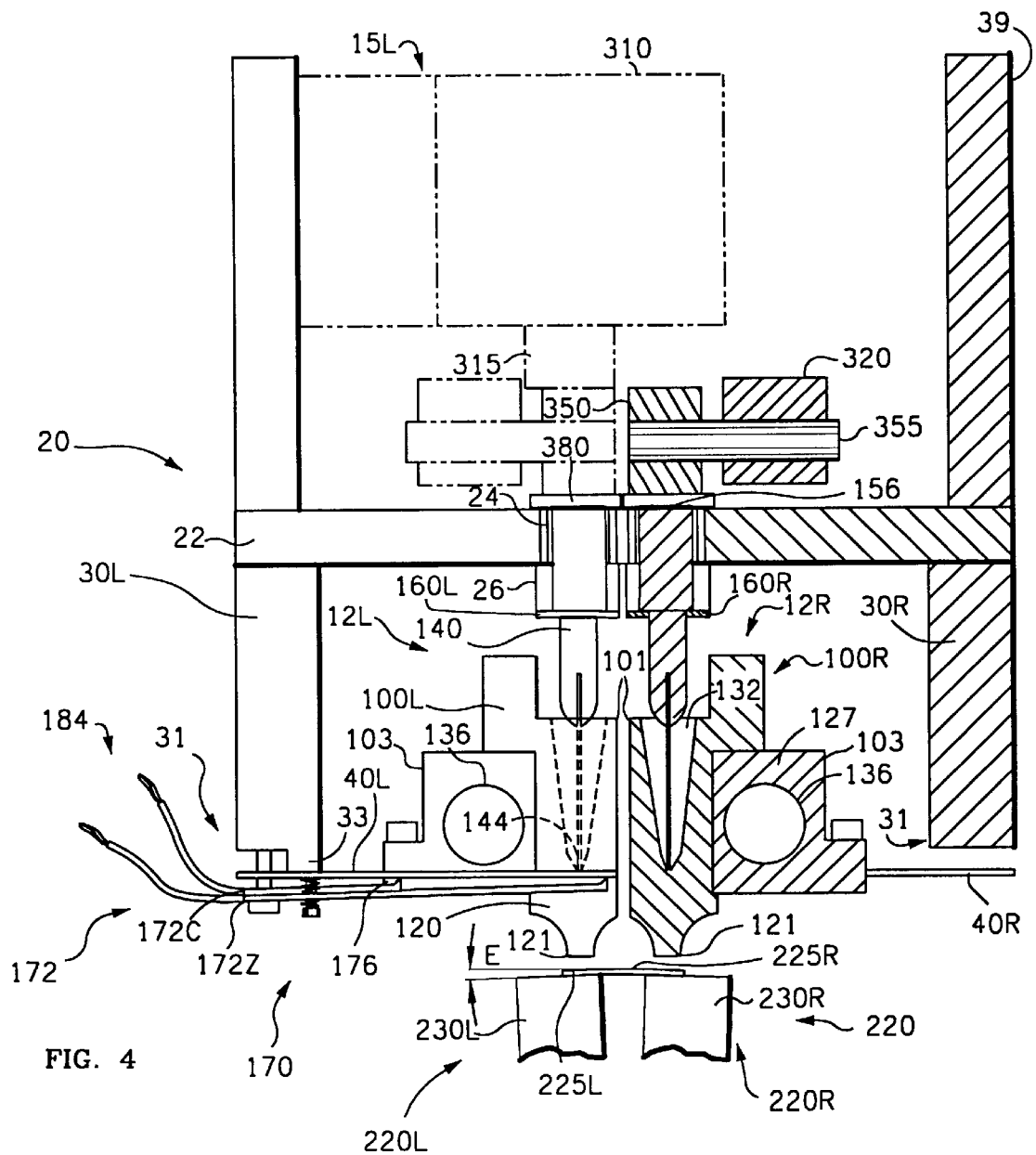
FIG. 4 is a front elevation view taken on line 4—4 of FIG. 3; the right side shown in cross-section and the left side shown in front view, partially cut away and showing the left pressure assembly in phantom.
Figure 5:
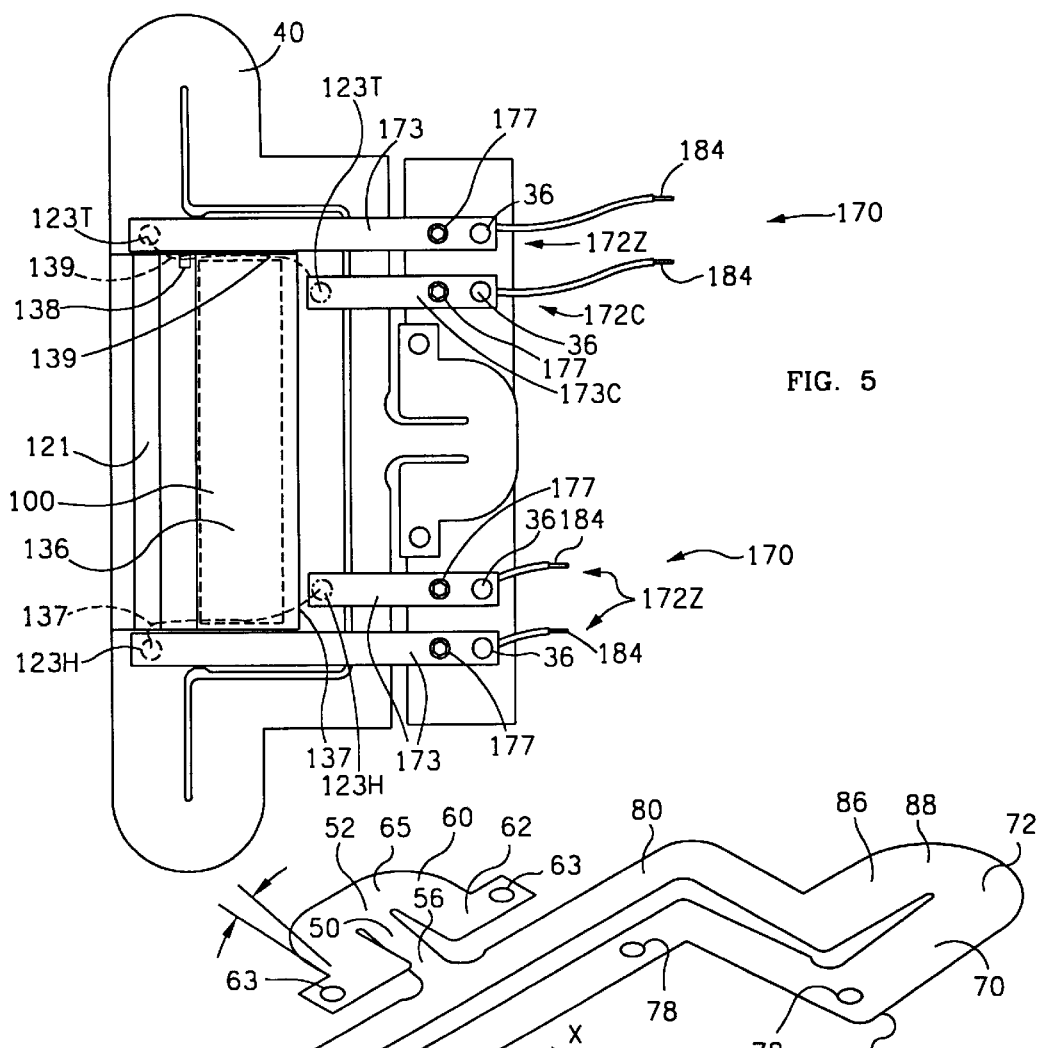
FIG. 5 is a bottom plan view of FIG. 1, the left bottom plan view being a mirror image.

Now including FIGS. 2–5; FIG. 2 is an exploded perspective view of the pressure head 10 of FIG. 1; FIG. 3 is a top plan view of the preferred embodiment of the invention; FIG. 4 is a front elevation view taken on line 4—4 of FIG. 3; the right side shown in cross-section and the left side shown in front view, partially cut away and showing the left pressure assembly 15L in phantom; and FIG. 5 is a bottom plan view of FIG. 1, the left bottom plan view being a mirror image.

In FIG. 4, the contact surface of left workpieces 220L is shown to be an angle E off the horizontal in the Y-axis. Therefore, upon contact, left horn 100L will rotate about bearing surface 144 the angle E so that its contact surface is aligned therewith. The contact area of right workpieces 220R is level in Y-axis. Thus, right horn 100R will not have to pivot in the Y-axis about bearing surface 144 of pivot rod 140.

Each horn assembly 12L, 12R generally comprises gimbal means, such as leaf spring gimbal 40, horn 100, pivot rod 140, horn biasing spring 160 and zero adjustment means including zero adjustment assemblies 172.

Each spaced apart side wall 30L,30R connected to base 22 includes on its distal or lower end 31 a gimbal support 33 for supporting its gimbal 40L,40R.

Figure 6:
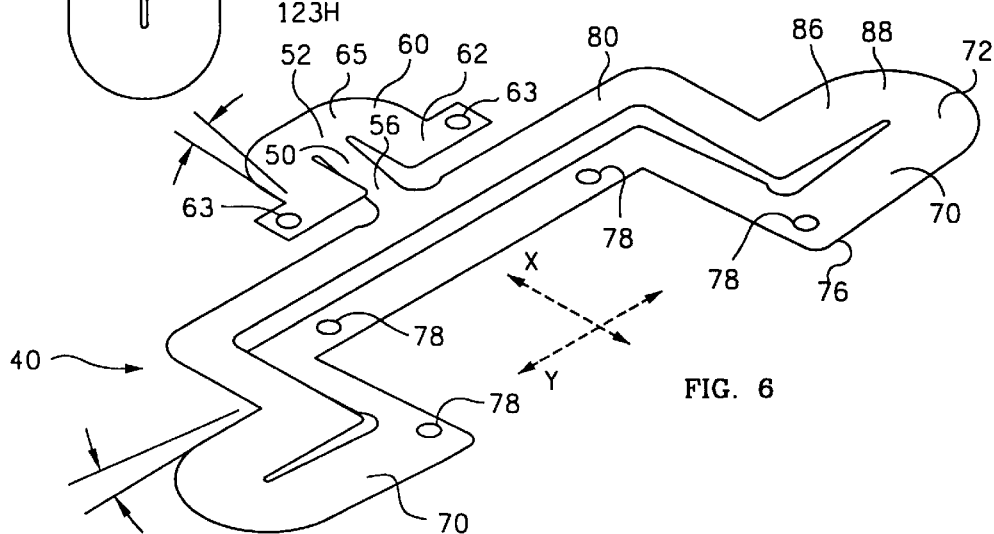
FIG. 6 is an enlarged exaggerated perspective view of a gimbal spring of the invention showing relative movements of the elements when a force is applied to the horn.
Figure 7:
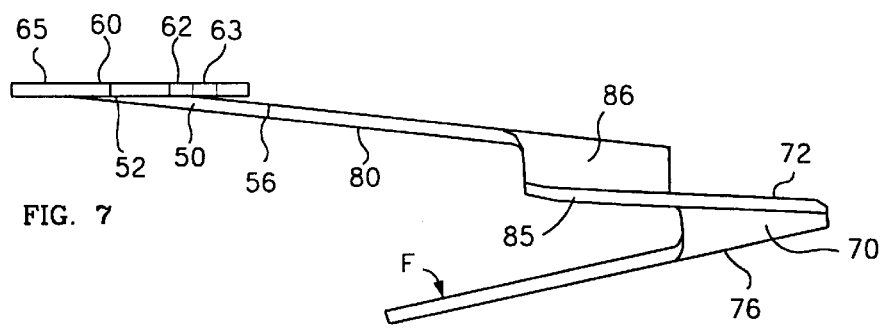
FIG. 7 is an enlarged exaggerated left side elevation view of the gimbal of FIG. 6.

Looking temporarily at FIGS. 6 and 7. FIG. 6 is an enlarged exaggerated perspective view of gimbal spring 40 of the invention showing relative movements of the elements when a force is applied to horn 100. FIG. 7 is an enlarged exaggerated left side elevation view of gimbal spring 40 of FIG. 6. Gimbal 40 may be machined out of a sheet of spring steel as shown or constructed of other suitably strong, resilient materials. Each gimbal 40 supports its horn 100 such that its horn 100 may move in the Z direction and may rotate about an X axis and a Y axis but may not move in the X or Y directions.

Gimbal 40 includes an outer cantilever 60 having an inner end 62 fastened to a gimbal support 33 such as by a screw fastener through bore 63 and having an outwardly extending outer end 65.

Outer torsion member 50, having in top view a longitudinal axis defining an X-axis defining the X-direction and defining a Y-direction horizontally perpendicular thereto. Outer torsion member 50 has an outer end 52 connected to outer end 65 of outer cantilever 60 and an inwardly disposed inner end 56 disposed toward horn 100. Outer end 65 of outer cantilever 60 supports outer end 52 of outer torsion member 50 in the Z-direction and such that outer end 52 cannot rotate about the X-axis and cannot move in the Y-direction.

In the preferred embodiment, outer torsion member 50 has a rectangular vertical cross-section having a width of approximately ten to thirty times the height. The moment of inertia of the cross section about its neutral Z-axis is very high such that, relative to outer end 52, INNER END 56 is essentially not translatable in the Y-direction. The polar moment of inertia of the cross section is such that, relative to outer end 52, inner end 56 is easily torsionally rotatable about its X-axis.

Preferably, as shown, outer cantilever 60 is cantilevered outward parallel to the longitudinal axis of outer torsion member 50 such that outer end 65 and may move in the Z-direction and inward in response to Z-forces exerted in it by outer torsion member 50. Since Z-direction forces on horn 100 are transferred outward to outer torsion members 50, this construction provides for movement of horn 100 in the Z-direction from Z-direction forces on it.

C-member 80 is C-shaped and is connected at its midpoint to inner end 56 of outer torsion member 50. Preferably, and as shown, C-member 80 includes near its distal ends 85 inner cantilevers 86 which function in the same manner as outer cantilever 60 so as to provide additional Z-axis travel for head 100.

A pair of inner torsion members 70 have in top view a longitudinal axis defining a Y-axis perpendicular to the X-axis. Each inner torsion member 70 has an outer end 72 connected to distal end 85 of C-member 80 and an inner end 76 connected to and supporting horn 100. Inner end 76 is fastened to horn 100 such as by fasteners through bores 78. The pair of inner torsion members 70 are co-linear. Inner torsion members 70 are constructed and function the same as outer torsion members 50 discussed above in that, relative to outer end 72, inner end 76, is torsionally rotatable about its Y-axis but is not translatable in the X-direction and cannot move in the Z-direction unless its outer end 72 moves in the Z-direction and inward.

Having only a single outer torsion member 50 allows a pair of gimbals 40 to support horns 100 in close proximity for operation on two proximal work areas.

Returning to FIGS. 1–5, each horn 100 has a central side 101, a lateral side 103, a front 105, a rear 110, a top 130 and a horn tip 120 having a bottom 121 including a contact area for contact with the contact area of workpiece 225, 230. The contact area of bottom 121 may be flat or may be of any suitable shape to perform the desired task. In the illustration, the contact area is flat and an elongated rectangle to join circuit 225 to component 230. Typically, bottom 121 of horn 100 is configured to be just the contact area but bottom 121 may be larger. Heat and pressure is applied through the contact area to the workpieces to join them. Cavity 132 on top 130 accepts pivot rod 140. Horn 100 may include one or more electrical devices. In the embodiment shown, a heater element 136 heats horn bottom 121. Heater element 136 is in contact with material of high heat conductivity, such as copper block 127, to provide better heat flow to horn bottom 121. The remainder of horn 100 is typically made of a stronger and less heat conductive material, such as stainless steel. A thermocouple 138 is attached to or is placed inside horn 110 monitor the temperature of tip 120 for controlling heaters 136. The four insulated electrical contact posts project downward from horn 100. As best seen in FIG. 5, the two front posts 123T are electrically connected to thermocouple 138 by insulated wires 139 and two rear posts 123H are electrically connected to heater 136 by wires 137.

As best seen in FIGS. 2, 4 and 5, associated with each horn 100 is a zeroing means 170. Zeroing means 170 is connected to frame 20 for selectively applying a force or forces to horn 100 for rotating horn 100 about the X-axis and/or the Y-axis such that horn 100 is biased to a given angular configuration prior to encountering workpiece 230. In the preferred embodiment shown, zeroing means 170 includes three a2 of four assemblies 172 connected to frame 20 make electrical contact with contact posts 123T, 123H. The other arm assembly, 172C is simply for electrical contact. Each zeroing arm assembly 172Z includes an arm 173 having a bearing 174, a through bore 175 and a contact tip 176, an adjustment screw 177 and biasing means, such as spring 178. Bearing 174 of arm 173 is slidingly disposed on journal 36 of frame 20. Adjustment screw 177 is freely journaled in bore 175 and threadingly engaged in threaded bore 38 in frame 20. Spring 178 surrounds adjustment screw 177 to downwardly bias arm 173 such that movement of adjustment screw 177 moves arm 172Z up and down. Contact arm assembly 172C is similar, but biasing spring 178C biases arm 173C slightly upward. The three zeroing arms 173Z contacting horn 100 determine a plane of rotation for horn 100. Means, such as wires 184, connected to each arm 173, provide electrical communication to the arm tips 176 which make electrical contact with electrical contact posts 123.

Pivot rod 140 includes a lower end 142 including a tip 143. Tip 143 includes a bearing surface 144 for bearing against inner end 133 of cavity 132 such that horn 100 may rotate about the X-axis and Y-axis and for applying downward pressure to horn 100. The shape of bearing surface 144 provides that the forces exerted by workpieces 225, 230 on horn 100 to produce the alignment moments are substantially similar.

Preferably the pivot points of bearing surface 144 is as close as practicable to the intersection of the X-axis and the Y-axis of torsion members 50,70 as this reduces the moment force required to rotate the head 110 into alignment with workpiece 230. Horn 100 may rotate about tip 143 and the X-axis and Y-axis to align with workpieces 225, 230 as pivot rod 140 applies downward pressure to horn 100 during encounter with workpieces 225, 230. Interference between pivot rod 140 and the wall of cavity 132 limits the maximum amount of rotation of horn 100.

Each horn biasing spring 160L,160R is supported by pair of spring supports 26 connected to frame 20. Each horn biasing spring 160L, 160R lightly downwardly biases its pivot rod 140 and therefore its horn 100. Horn biasing spring 160 is a leaf spring supported at its outer ends by supports 26 and arched upward so as to impart a small downward force on pivot rod 140 which transfers the force to horn 100. Although leaf spring 160 is shown, other means are contemplated. For example, a coil spring could be used.

Pivot rod upper end 145 terminates in a transfer rod 150. Transfer rod 150 includes an upper guide rod 153 for sliding vertical travel in bushing 24 in base 22.

Preferably, a pressure assembly 15 is associated with each horn assembly 12. Pressure assembly 15 provides means for controlling the force on pivot rod 140 independently of the thrust force. Each pressure assembly 15 includes means for providing a controlled force, such a pressure cylinder, such as air cylinder 310 and piston 315, lever arm 320, pivot block 330, pivot rod follower 350, piston follower 340 and stop 380. Pivot block 330 and stop 380 are connected to frame 20, such as to base 22. Lever 320 includes a first end axle 325 pivotally connecting lever 320 to pivot block 330. Piston follower 340, attached to lever 320 by axle 345, is held down by piston 315 of air cylinder 310 at pre-selected force to stop 380 which retains pivot rod follower 350, attached to lever 320 by axle 355, a slight distance 156 from top end 145 of pivot rod 140. As seen in FIG. 4, in the non-pressure situation, there is a slight gap 156 between the upper end 145 of pivot rod 140 and the rod follower 350 of pressure assembly 15. Thus, when horn 100 first encounters workpiece 230 there is only the small downward force of bias spring 160 on horn 100 such that horn 100 may easily gimbal as necessary upon encountering workpiece 230. As is shown in FIG. 1, once the encounter with workpiece 230 has forced horn 100 upward the distance of the gap 156, then pivot rod 140 is held down with the downward force on rod follower 350 and this force is transferred through pivot rod 140 to horn 100 to workpiece 230. In the embodiment shown, because of the mechanical advantage of lever 320, the downward force on pivot rod 140 is twice the downward force by air cylinder 310 on piston follower 340. Therefore, a smaller capacity air cylinder 310 can be used. Since each air cylinder can be independently controlled, the time and pressure of each bonding can be independently controlled.

Having described the invention, it can be seen that it provides for pressure head to have a pair of gimbaled horns in very close proximity and for each horn to operate at a different pressure.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention. In the claim, the directions, such as vertical, horizontal, up and down are relative for descriptive purposes and are not absolute directions.

I claim:

1. A pressure head for relative movement in a vertical Z-axis direction for contacting a pressure area; said head comprising:
    a frame;
    a first horn for contacting a first pressure area;
    a first gimbal connected to said frame and gimbally supporting said first horn such that said first horn may rotate about an X-axis and a Y-axis and may translate in the Z-direction relative to said frame; said gimbal having only a single X-axis torsion member having a longitudinal axis defining the X-axis and supporting said horn for rotation about the X-axis; and
    a pivot rod including:
        a lower end including:
            a tip bearing against said horn such that said horn may rotate about the X-axis and Y-axis and for applying downward pressure to said horn.

2. The pressure head of claim 1 further including:
    pressure assembly means controlling a downward force on said horn.

3. The pressure head of claim 1 further including:
    pressure assembly means controlling a downward force on said pivot rod.

4. The pressure head of claim 1 wherein:
    said gimbal further comprises:

a C-shaped C-member supported by said X-axis torsion member; and a pair of co-linear X-axis torsion members supported by the distal ends of said C-member and supporting said horn.

5. The pressure head of claim 4 further including:

pressure assembly means controlling a downward force on said horn.

6. The pressure head of claim 4 further including:

pressure assembly means controlling a downward force on said pivot rod.

7. A Pressure head for relative movement in a vertical Z-axis direction for contacting pressure areas: said head comprising:

a frame;

a first horn for contacting a first pressure area;

a first gimbal connected to said frame and gimbally supporting said first horn such that said first horn may rotate about a first horn X-axis and a first horn Y-axis and may translate in the Z-direction relative to said frame; said first gimbal having only a single X-axis torsion member having a longitudinal axis defining the first horn X-axis and supporting said first horn for rotation about the first horn X-axis;

a first pivot rod including:
  a lower end including:
    a tip bearing against said first horn such that said first horn may rotate about the first horn X-axis and first horn Y-axis and for applying downward pressure to said first horn;

a second horn for contacting a second pressure area;

a second gimbal connected to said frame and gimbally supporting said second horn such that said second horn may rotate about a second horn X-axis and a second horn Y-axis and may translate in the Z-direction relative to said frame; said second gimbal having only a single X-axis torsion member having a longitudinal axis defining the second horn X-axis and supporting said second horn for rotation about the second horn X-axis; and a second pivot rod including:
  a lower end including:
    a tip bearing against said second horn such that said second horn may rotate about the second horn X-axis and second horn Y-axis and for applying downward pressure to said second horn.

8. The pressure head of claim 7 further including:

a first pressure assembly means controlling a downward force on said first horn; and a second pressure assembly means controlling a downward force on said second horn.

9. The pressure head of claim 7 further including:

pressure assembly means controlling a downward force on said first pivot rod and a downward force on said second pivot rod.

* * * * *